United States Patent
Simmons et al.

(10) Patent No.: US 7,351,756 B2
(45) Date of Patent: Apr. 1, 2008

(54) TOUGHENED POLYETHYLENE TEREPHTHALATE

(75) Inventors: Walter John Simmons, Martinsburg, WV (US); Walter Neal Simmons, Durham, NC (US)

(73) Assignee: Terrasimco Inc., Martinsburg, WV (US)

( * ) Notice: Subject to any disclaimer, the term of this patent is extended or adjusted under 35 U.S.C. 154(b) by 0 days.

(21) Appl. No.: 11/424,778

(22) Filed: Jun. 16, 2006

(65) Prior Publication Data

US 2006/0258782 A1    Nov. 16, 2006

Related U.S. Application Data

(63) Continuation of application No. PCT/US2004/042094, filed on Dec. 16, 2004.

(60) Provisional application No. 60/529,750, filed on Dec. 17, 2003.

(51) Int. Cl.
*C04B 24/28* (2006.01)

(52) U.S. Cl. ............................................. 524/5
(58) Field of Classification Search ............... 524/5
See application file for complete search history.

(56) References Cited

U.S. PATENT DOCUMENTS

| | | | | |
|---|---|---|---|---|
| 3,953,565 A | * | 4/1976 | Mizutani et al. | 264/129 |
| 4,272,475 A | * | 6/1981 | Chi | 264/210.1 |
| 5,161,915 A | | 11/1992 | Hansen | 405/129 |
| 5,389,706 A | * | 2/1995 | Heathman et al. | 166/293 |
| 5,624,980 A | * | 4/1997 | Kobori | 524/5 |
| 6,583,217 B1 | | 6/2003 | Li et al. | 524/650 |

OTHER PUBLICATIONS

Brandt, A.M., *Cement-based Composites: Materials, Mechanical Properties and Performance*, E & FN Spon, U.K., 1995, p. 47-55.
David J. White, "Microstructure of Composite Material From High-Lime Fly Ash and RPET," *Journal of Materials in Civil Engineering* (Feb. 2000), p. 60-65.
International Search Report for PCT application No. PCT/US2004/042094.
International Preliminary Report on Patentability for PCT application No. PCT/US2004/042094.

* cited by examiner

*Primary Examiner*—Peter Szekely
(74) *Attorney, Agent, or Firm*—Steptoe & Johnson LLP

(57) ABSTRACT

A composite material is disclosed having a matrix formed of polyethylene terephthalate and cement particles distributed in the matrix. The cement particles may be Portland cement. About 50 wt % or less of the composite material is cement particles. The cement particles have an average particle size of no more than about 100 μm.

10 Claims, No Drawings

TOUGHENED POLYETHYLENE TEREPHTHALATE

CROSS-REFERENCE TO RELATED APPLICATIONS

This application is a continuation of the U.S. National Stage designation of co-pending International Patent Application PCT/US2004/042094 filed Dec. 16, 2004, which claims the benefit of U.S. Provisional Application No. 60/529,750 filed Dec. 17, 2003 under 35 U.S.C. § 119(e), and the entire contents of each of these applications are expressly incorporated herein by reference thereto.

FIELD OF THE INVENTION

The invention relates to toughened polyethylene terephthalate. More particularly, the invention relates to a composite material formed of cement and recycled PET, along with a method of making same.

BACKGROUND OF THE INVENTION

Waste polyethylene terephthalate (PET) polymer is neither environmentally biodegradable nor compostable, and thus suffers from disposal problems. Recycling has become a viable alternative to the long-term accumulation of garbage, and there is substantial availability of recyclable PET waste. For example, post-consumer PET derived from soft drink bottles is available in bulk for relatively low cost. Bottle-grade PET is known to be of high quality among the various PET grades, and is available particularly as washed flakes. There are major incentives from environmental perspectives and governmental regulatory directives to find new and improved uses for PET waste.

As an unreinforced, semi-crystalline thermo-plastic polyester, PET has excellent wear resistance, excellent hardness and stiffness, very good creep resistance, low coefficient of friction, high flexural modulus, and superior dimensional stability. Nevertheless, PET—particularly following melting and resolidifying of post-consumer recyclable waste—can be quite brittle and as such can be inappropriate in some applications.

U.S. Pat. No. 6,583,217 B1 to Li et al. is directed to a composite material composed of fly ash and waste PET. Melted waste, chemically unmodified PET material and fly ash particles are mixed in a vessel to disperse fly ash particles in the melted PET material. The resulting mixture then is cooled to solidify the melted PET material to form a composite material having a matrix comprising PET and dispersoids distributed in the matrix and comprising fly ash particles.

Despite known composite materials, there exists a need for alternative PET materials with less susceptibility to brittle behavior. More particularly, there exists a need for a PET material appropriate for use in coating metals used in mechanically rigorous applications. Also, there exists a need for a composite material formed of cement and recycled PET, along with a method of making same.

SUMMARY OF THE INVENTION

The invention relates to a composite material having a matrix comprising polyethylene terephthalate and cement particles distributed in the matrix. In some embodiments, the matrix comprises chemically unmodified polyethylene terephthalate material. The cement particles may comprise, consist of, or consist essentially of Portland cement that optionally may be substantially Portland type I cement or substantially Portland type II cement. About 50 wt % or less of the composite material may be cement particles. Alternatively, about 40 wt % or less of the composite material may be cement particles. In some embodiments, about 30 wt % or less of the composite material may be cement particles, and in other embodiments about 20 wt % or less of the composite material comprises cement particles. Also, in some embodiments, about 15 wt % or less of the composite material may be cement particles.

About 5 wt % to about 15 wt % of the composite material may be cement particles in some embodiments, while in other embodiments about 5 wt % to about 10 wt % of the composite material may be cement particles. The cement particles may have an average particle size of no more than about 100 μm.

DETAILED DESCRIPTION OF THE PREFERRED EMBODIMENTS

Injection molding using melts of flakes of post-consumer PET derived from soft drink bottles has been experimentally demonstrated to produce a very brittle PET material. Such material, at a thickness of about 6 mm, has been shown to be easily breakable by hand.

The addition of Portland-like cements (or similar chemical compositions) to PET in the range of about 1 wt % to about 50 wt % advantageously may result in materials with enhanced mechanical behavior.

The chemical composition of Portland cements is generally presented below in Table I:

TABLE I

| Component | Mass Contents(%) |
|---|---|
| CaO | 58-66 |
| $SiO_2$ | 18-26 |
| $Al_2O_3$ | 4-12 |
| $Fe_2O_3$ + FeO | 1-6 |
| MgO | 1-3 |
| $SO_3$ | 0.5-2.5 |
| $K_2O$ and $NaO_2$ | <1 |

See, e.g., Brandt, A. M., *Cement-Based Composites: Materials, Mechanical Properties and Performance*. E & F Spon, 1995.

Experimentally, the addition of about 5 wt % to about 15 wt % Portland cement to recycled PET has been found to greatly enhance the toughness and modulus of the polymer. Filler material in the form of particulate Portland cement has been added to melts of flakes of post-consumer PET derived from soft drink bottles. The Portland cement had an average particle size of less than about 100 μm to facilitate uniform distribution, especially at higher cement levels.

Specifically, when about 5 wt % to about 15 wt % Portland type II cement was added to the recycled PET flakes and melts of the PET/cement material were injection molded, the final material was found to be noticeably tougher and more resilient to impact. It was generally shown that the greater the percentage of cement, the greater the realized toughness. At no more than about 15 wt %, most of the cement stuck to the surface of the PET flakes resulting in a fairly homogenous melt and injection molded material. However, it was shown to be difficult to add more than about 15 wt % cement to the PET flakes because the cement appeared to separate from the flakes resulting in a non-homogenous melt and injection molded material.

Also, during the experimentation, no steam or condensate was observed on the mold or escaping from the ram cylinder when cement was added. From this observation, it is believed that the cement acts as a getter, absorbing much of the water that is on the PET flakes.

Additional laboratory-scale experimentation has demonstrated similar toughness increases as a result of the addition of about 5 wt % to about 10 wt % Portland type I cement to recycled PET flakes. Again, the Portland cement had an average particle size of no more than about 100 µm. From melts of such combinations, much tougher and less brittle solid materials were produced.

The reason that Portland cement toughens PET is not well understood. Three explanations for the observed toughening are proposed. First, the cement may toughen the polymer by inhibiting crack propagation. Second, the cement may act as a getter for water which is known to greatly reduce PET chain length. Third, the alkali metal in the cement may act as a weak cross-linking agent forming larger chain lengths and thus resulting in greater toughness.

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

What is claimed is:

1. Composite material having an injection molded matrix comprising at least about 50 wt % washed, post-consumer recycled, melted polyethylene terephthalate flakes and about 1 wt % to about 15 wt % cement particles distributed in the matrix in order to absorb water which is present on said flakes.

2. The composite material of claim 1, wherein the matrix comprises chemically unmodified polyethylene terephthalate material.

3. The composite material of claim 1, wherein the cement particles comprise Portland cement.

4. The composite material of claim 3, wherein the Portland cement substantially comprises Portland type I cement.

5. The composite material of claim 3, wherein the Portland cement substantially comprises Portland type II cement.

6. The composite material of claim 1, wherein about 5 wt % to about 15 wt % of the composite material comprises cement particles.

7. The composite material of claim 1, wherein about 5 wt % to about 10 wt % of the composite material comprises cement particles.

8. The composite material of claim 1, wherein the cement particles have an average particle size of no more than about 100 µm.

9. The composite material of claim 4, wherein the cement particles have an average particle size of no more than about 100 µm.

10. The composite material of claim 4, wherein the cement particles have an average particle size of no more than about 100 µm.

* * * * *

UNITED STATES PATENT AND TRADEMARK OFFICE
CERTIFICATE OF CORRECTION

| | | |
|---|---|---|
| PATENT NO. | : 7,351,756 B2 | Page 1 of 1 |
| APPLICATION NO. | : 11/424778 | |
| DATED | : April 1, 2008 | |
| INVENTOR(S) | : Simmons et al. | |

It is certified that error appears in the above-identified patent and that said Letters Patent is hereby corrected as shown below:

In claim 10, Col. 4, line 32, replace "of claim 4" with --of claim 5--.

Signed and Sealed this

Nineteenth Day of August, 2008

JON W. DUDAS
*Director of the United States Patent and Trademark Office*